May 24, 1932.  G. J. FLETCHER  1,860,280
SPRING SUSPENSION
Filed June 29, 1928   2 Sheets-Sheet 1
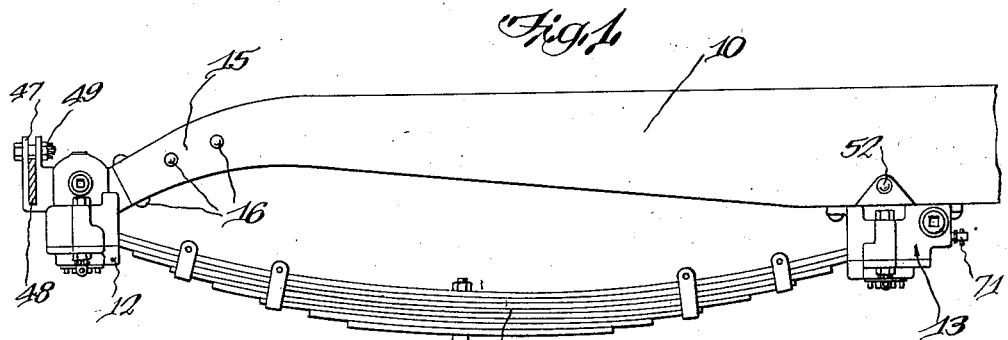
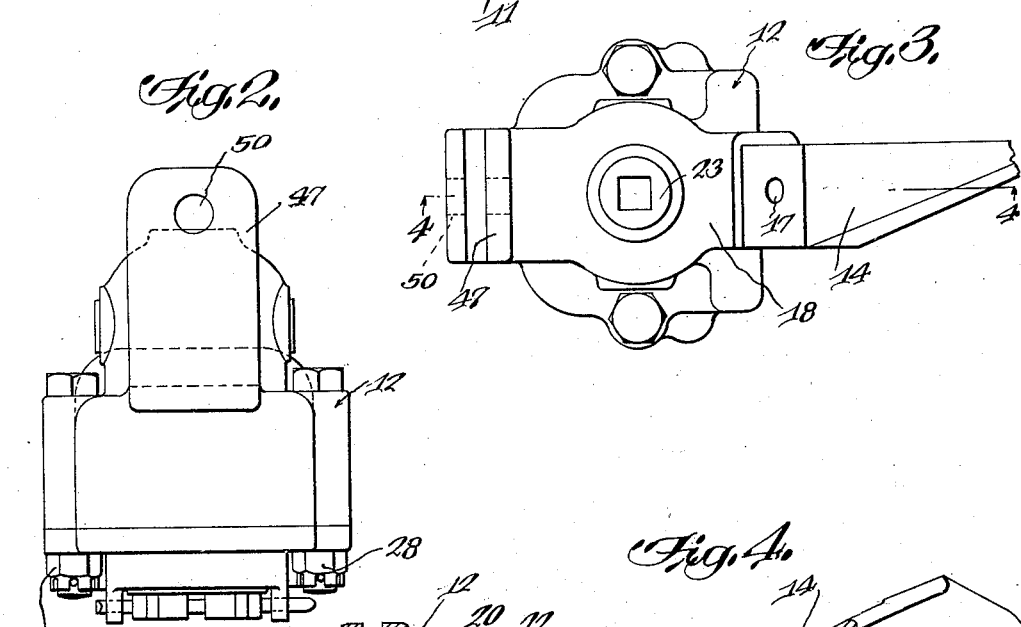
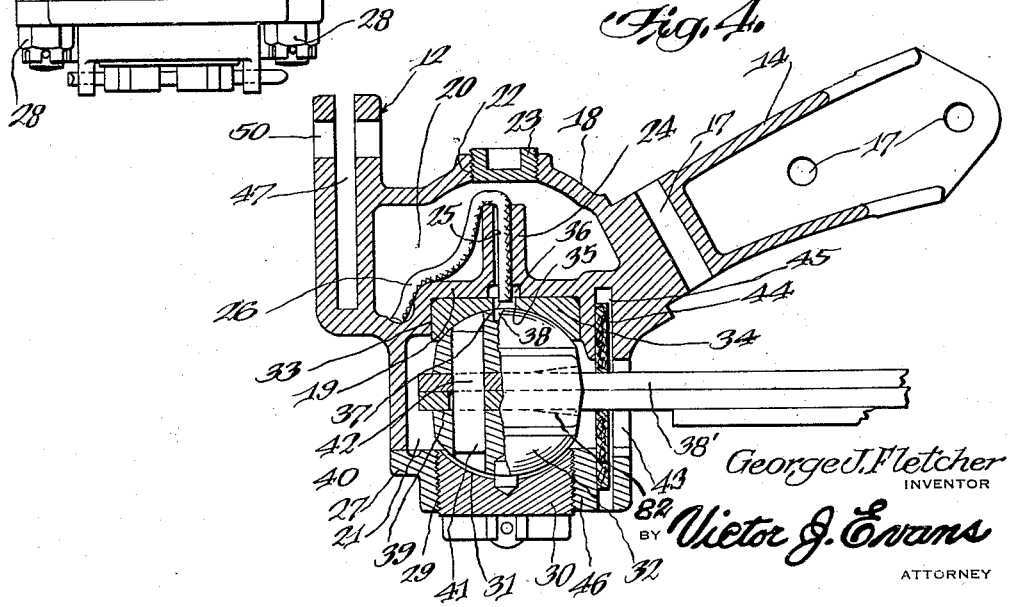
George J. Fletcher
INVENTOR
BY Victor J. Evans
ATTORNEY

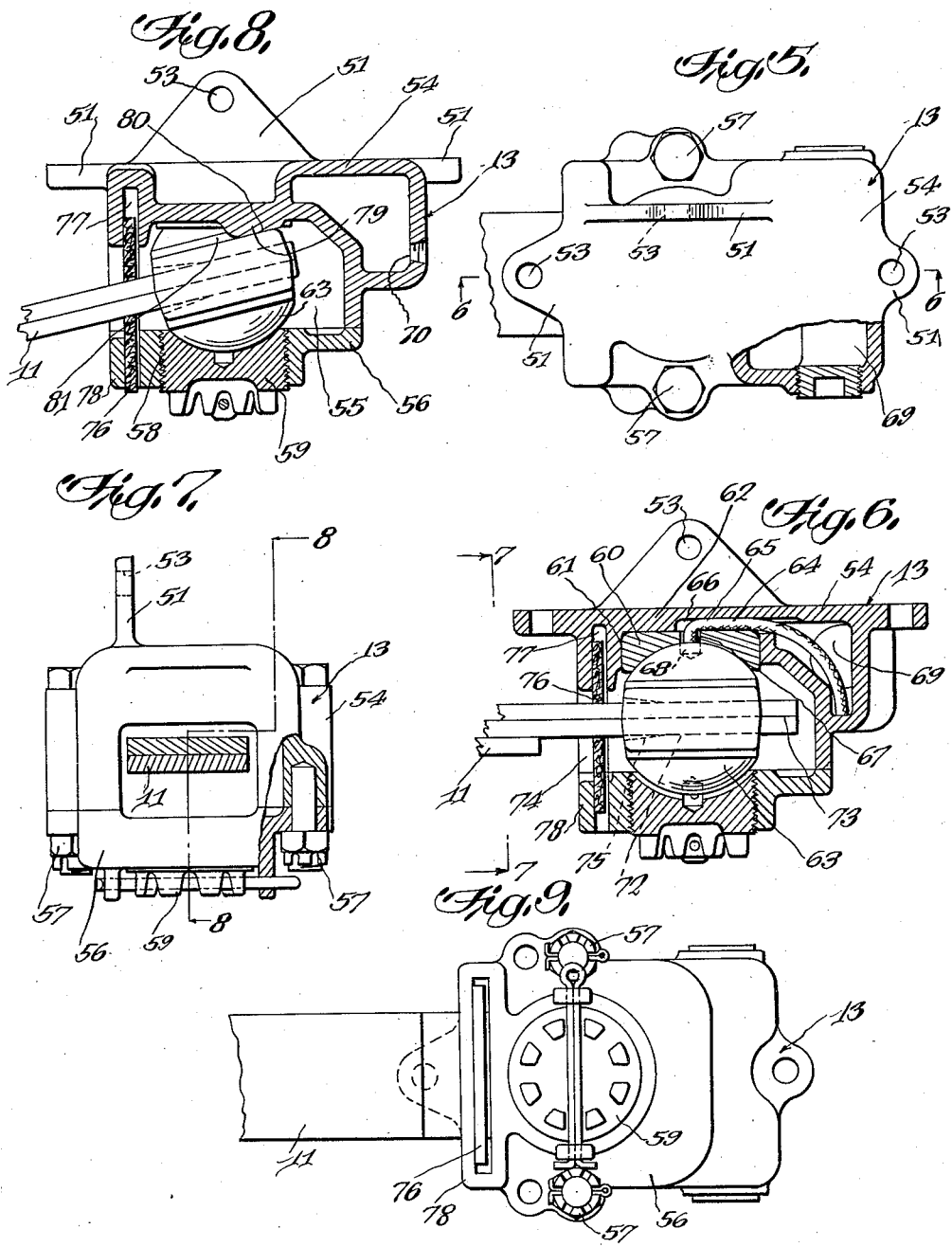

Patented May 24, 1932

1,860,280

UNITED STATES PATENT OFFICE

GEORGE J. FLETCHER, OF CHICAGO, ILLINOIS

SPRING SUSPENSION

Application filed June 29, 1928. Serial No. 289,179.

This invention relates to certain novel improvements in spring suspensions, and has for its principal object the provision of an improved construction of this character which will be highly efficient in use and economical in manufacture.

Among the several objects of this invention is the provision for suspending a spring from the chassis of a vehicle in such a manner as to decrease the vibratory impulses transmitted to the chassis and body of the vehicle while driving over rough grounds and whereby to lessen the possibility of breakage of the spring per se.

A still further object of the invention is the novel provision for connecting the end portions of a spring construction to the supporting brackets whereby the spring may have free re-flex movement and free movement when assuming its normal position, thereby lessening the shock which otherwise would be transmitted to the chassis and body of a vehicle.

A still further object of the invention is the novel provision of a spring suspension device which may be easily applied in position and disassembled when required.

A still further object of the invention is the novel means for lubricating the spring suspension which lubrication is employed upon the principle of capillary attraction.

Other objects will appear hereinafter.

The invention consists in the novel combination and arrangement of parts to be hereinafter described and claimed.

The invention will best be understood by reference to the accompanying drawings, wherein a preferred form of construction is shown, and in which:

Fig. 1 is a fragmentary side elevational view of a chassis showing my improved suspension means associated therewith;

Fig. 2 is a face elevational view of the outer spring suspension means;

Fig. 3 is a top plan view of the same;

Fig. 4 is a sectional detail view of the same taken substantially on the line 4—4 of Figure 3;

Fig. 5 is a top plan view of the inner spring suspension means;

Fig. 6 is a sectional detail view of the same taken substantially on line 6—6 of Figure 5;

Fig. 7 is a side view of the same taken substantially on line 7—7 of Figure 6;

Fig. 8 is a sectional detail view of the same taken substantially on line 8—8 of Figure 7; and Fig. 9 is a bottom plan view of the spring suspension means shown in Figure 5.

Referring more particularly to Figure 1 of the drawings, a chassis is indicated at 10, a spring structure at 11, having its end portions connected to the chassis by means of spring suspension means 12 and 13 respectively.

In many respects, the spring suspension means 12 and 13 are similar in construction but for convenience each spring suspension means will be described separately and individually.

In Figures 2 to 4 inclusive, I have illustrated the spring suspension means 12, and in this instance, this spring suspension means includes a bracket arm 14 which is adapted to fit snugly against the end 15 of the chassis 10 and be secured thereto by means of rivets 16 which are adapted to be in projection through openings 17 formed in the arm 14. This arm 14 is formed as an integral part of a body 18 divided by means of a partition 19 into an upper receptacle 20 and a housing 21. The receptacle 20 is adapted to contain a quantity of oil for lubrication purposes and this oil is admitted into the receptacle through an opening 22 normally closed by means of a plug 23 threaded into said opening as best shown in Figure 4. Formed upon the partition 19 is an upstanding projection 24 provided with a central bore 25. This projection 24 projects into the receptacle 20 and is adapted to support a wick 26 having one end portion threaded through the bore 25 with its opposite end portion submerged in the oil, as best shown in Figure 4. The housing 21 has its bottom open and normally closing this opening is a cap 27 secured in closing position to the body 18 by means of nut bearing bolts 28 (Figure 2).

This cap 27 has a central opening 29 formed therein and this opening is adapted to be closed by a bearing plug 30 which plug 30 provides a seat 31 for a ball 32.

The partition 19 provides a recess 33 for the purpose of receiving the bearing plate 34 which is provided with a bearing surface 35 snugly fitting the opposite side of the ball element 32.

The bore 25 has its lower end portion terminating into an enlarged opening 36 which registers with an opening 37 formed in the plate 34 for the purpose of admitting oil to an oil recess 38 formed in the ball 32 whereby the oil may find its way around the ball 32 into and upon the bearing seat 31 to efficiently provide lubrication for the ball during its movement by fluctuation of this spring.

The spring end 38' is projected through a slot 39 formed in the ball 32 and this end of the spring is provided with an opening which is registered with an opening 41 formed in the ball 32. Positioned in this opening 41 and projected through the opening in the spring end 38' registered therewith is a pin 42 which secures this end of the spring to the ball.

The spring end 38' projects through an enlarged opening 43 in a direction for connection with the ball 32 and in order to prevent dust and other foreign elements from collecting in the housing this opening is closed by means of a fibrous plate 44 slidably mounted in a recess 45 formed in the wall 46 of the housing.

Formed as an integral part of the body 18 is a bifurcated supporting bracket 47 to which the ends of the connecting brackets or arms 48 of a bumper or the like may be attached by means of nut bearing bolts 49 projected through the openings 50 formed in this bracket.

The above description relates to the preferred form of construction of one of the outer end suspension means and I will now describe the inner end spring suspension means in its preferred form of construction.

This inner spring suspension means includes ears 51 adapted to be connected to the chassis as best shown in Figure 1, by means of rivets 52 projected through openings 53 formed in the ears 51.

These ears are formed as an integral part of a body 54 providing a housing 55 open at its bottom portion. This open bottom of the housing 55 is closed by means of a plate 56 secured to the body by means of nut bearing bolts 57. The plate 56 provides a central opening 58 and threaded into this opening is a bearing cup 59 which co-operates with a bearing plate 60 confined in a recess 61 formed in the top wall 62 of the body to rotatably support a ball 63. A lubricant is fed to the ball 63 by means of a wick 64 having one end portion 65 confined in a recess 66 formed in the top wall 62 and extended into an opening 67 which registers with an oil bore 68 formed in the ball 63. The opposite end portion of this wick is confined in a reservoir 69 formed in the body 54 at the side thereof. The lubricant is admitted to this reservoir through an opening 70 normally closed by a plug 71.

The ball 63 has an opening 72 extending therethrough and projected through this opening 72 so as to be slidable therein is an end portion 73 of spring 11. This end portion 73 of spring 11 passes through an enlarged opening 74 formed in the body 54. The opening 72 has a chamfered mouth 75 and the opening 39 has a similarly chamfered mouth 82. There is thus provided a slight clearance between the sides of the spring 11 and those portions of the balls 32 and 63 which define the chamfered mouths. When the spring 11 flexes there is therefore a slight clearance or play for the spring where the spring enters the chamfered mouths 75 and 82 of the balls and due to this clearance the flexing motion of the spring is gradually rather than abruptly transmitted to the balls 32 and 63. Experience teaches a close fit between the spring 11 and the openings 39 and 72 tends to break or snap the spring 11 where it enters the openings 39 and 72 in the balls and by chamfering the mouths 75 and 82 of these openings this danger of breaking the spring 11 is materially reduced.

The opening 74 is closed by a fibrous plate 76 slidably arranged in a recess 77 formed in the wall 78 of the body 54.

In Figure 8, the top wall 62 of the body 54 provides a lug 79 having an inclined surface 80 adapted to engage a ridge 81 of the ball when the ball is rotated in one direction whereby to limit the rotation of the ball by the spring flexing.

In use, the spring suspension means are associated with the chassis 10 as best shown in Figure 1, and when the several parts of the suspension means are assembled in their connection with the spring and chassis it will be seen that during flexing of the spring, the spring will have slidable engagement with the ball 63 and both balls will oscillate according to movement of the spring, thus diminishing and checking the rebound action of the spring during operation of the vehicle with which it is associated.

It will be seen that the several parts are simple in structure and that the suspension means is of such a nature as will greatly lessen the possibility of breakage, brought about by shock and rebound.

While I have illustrated and described the preferred form of construction for carrying the invention into effect this is capable of variations and modifications without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A suspension for a spring unit including a body providing a housing, a rotatable element confined in the housing and having an opening therein for the projection of one end portion of the spring unit, said end portion rotating said element when the spring unit flexes, said element having a ridge thereon, and a lug carried by the housing having an inclined surface thereon adapted to be engaged by said ridge to limit rotation of said element.

2. A device for suspending an end portion of a spring unit of a vehicle including a body providing a housing having one wall provided with an opening and having a recess in said one wall communicating with said opening and extending at right angles thereto, said housing having an opening in another wall thereof, said last named wall being extended substantially at right angles to said first named wall, a bearing block providing a pocket arranged in said housing opposite said second named opening, a member providing a pocket arranged in said second named opening, a ball element mounted in said pockets and having an opening therein, said end portion of said spring unit being extended through said first named opening in said housing and through the opening in said ball element, a plate disposed in said recess having an opening therein through which said spring unit may be extended, said plate serving to prevent passage into said housing toward said ball element, said body providing an oil reservoir, said bearing block having an opening therein, said housing having a passage therein establishing communication between said last named opening and said oil reservoir, and a wick in said passage for conducting oil from said reservoir to said last named opening to lubricate said ball.

3. A suspension for a spring unit including a body providing a housing, a rotatable element confined in the housing and having an opening therein for the projection of one end portion of a spring unit, said end portion rotating said element when the spring unit flexes, said element having a ridge formed thereon, and a member carried by the housing adapted to be engaged by said ridge to limit rotation of said element.

4. A suspension for a spring unit including a body providing a housing, a rotatable element confined in the housing and having an opening therein for the projection of one end portion of a spring unit, said element providing at the inner end of the opening provided by said element a chamfered mouth, said end portion rotating said element when the spring unit flexes, said element having a ridge formed thereon, and a member carried by the housing adapted to be engaged by said ridge to limit rotation of said element.

In testimony whereof I affix my signature.

GEORGE J. FLETCHER.